Patented June 24, 1930

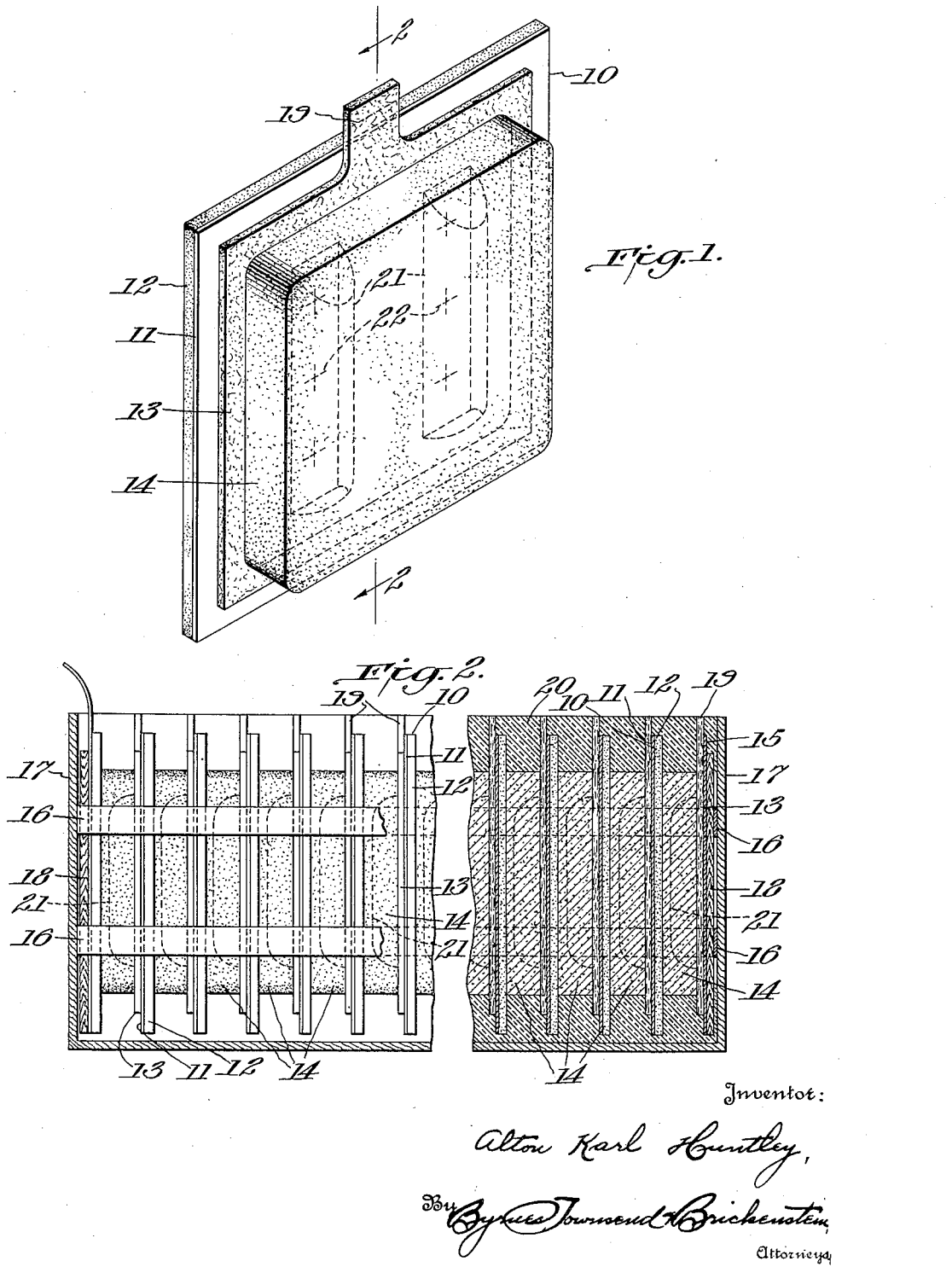

1,765,673

UNITED STATES PATENT OFFICE

ALTON KARL HUNTLEY, OF CLEVELAND, OHIO, ASSIGNOR TO NATIONAL CARBON CO., INC., A CORPORATION OF NEW YORK

DRY-CELL BATTERY

Application filed June 6, 1927. Serial No. 196,865.

This invention relates to dry cells, and more particularly to batteries of dry cells of the flat type.

The principal object of the invention is to provide an inexpensive and conveniently assembled means for venting gases generated within batteries of flat type cells either on shelf or in service. Other objects will appear as the description proceeds.

The venting of dry cells may be controlled within desired limits by established capillary passages through the seal. I have found that capillary passages may be established between the interior of the cell and the atmosphere so as to bring about controlled venting by extending a portion of the bibulous liner or spacer through the seal, or by joining a porous tab to said spacer and causing the tab to extend through the seal.

In the drawing:

Fig. 1 is a perspective view of a cell unit comprising a "duplex" electrode, a bibulous spacer and a depolarizer mix cake, said unit being adapted to be assembled with other similar units to form a multi-cell battery of the flat type such as is disclosed in U. S. patent to Rider and Huntley, No. 1,508,987.

Fig. 2 is a part sectional view and part side elevation of a battery comprising a plurality of cell units such as shown in Fig. 1, the portion of Fig. 2 shown in section being taken on line 2—2 of Fig. 1.

Electrodes of the type herein referred to as "duplex" electrodes comprise a plate or strip of zinc or other suitable metal coated on one side with a plastic electrolyte-resistant material possessing electrically conductive properties. Such electrodes are adapted, when assembled with other necessary dry cell elements in a multi-cell battery, to act respectively as the negative electrode of one cell and the positive electrode of the next succeeding cell.

Referring to Fig. 1 of the drawing, 10 is a duplex electrode comprising a zinc plate 11 and a conductive carbonaceous coating 12. In contact with the zinc side of the duplex electrode 10 is a spacer 13 consisting of a suitable bibulous sheet material such as pulpboard. A depolarizer mix cake 14 is centered upon the side of the spacer 13 remote from the zinc plate 11. As shown in Fig. 2, a multi-cell battery is formed by assembling the desired number of duplex electrodes, spacers and depolarizer mix cakes in such relation that each mix cake 14 contacts with the coated side 12 of the adjacent duplex electrode 10 and is separated from the zinc side 11 of the next succeeding duplex electrode by a bibulous spacer 13. One end electrode of the battery is shown as a plain zinc plate 15. The battery elements are also shown as held in a unitary assembly by means of binding tape 16, and when such binding or taping means is employed the battery is assembled before it is placed within the container 17. However, it is to be understood that the battery may be assembled directly within the container. End boards 18 of wood or other suitable stiff insulating material are also shown.

Each of the bibulous spacers 13 is provided with a tab or projecting end portion 19 adapted when the spacers are assembled with the duplex electrodes and depolarizer mix cakes in the battery to project beyond the peripheral edge portions of the duplex electrodes to a point at least flush with, if not beyond the upper edge of the container 17, so that when the space between the battery assembly and the container is filled with plastic sealing material 20 the tabs 19 will have their upper extremities exposed to the atmosphere. Preferably the tabs are of sufficient length to extend above the upper edge of the container 17 and are cut off flush with the upper surface of the finished battery after the seal has been poured, thus insuring that the venting properties of the bibulous material composing the tabs are not impaired by adhering sealing plastic with which the ends of the tabs may have become coated during the pouring operation.

It will be understood that instead of forming the tab as an integral part of the spacer it may be made separately and then attached to the spacer in any suitable manner as by sewing or by the use of an adhesive.

The usual amounts of electrolyte salts and moisture are incorporated in the depolarizing mix and the spacers 13 as is customary. Also paste electrolyte may be applied to the body portions of each of the spacers on that side which is to contact with the zinc side of the duplex electrode.

The tab portions of the spacers are treated to render them water repellent. Otherwise, owing to the moist condition of the body portions of the spacers, moisture would be carried out of the cells by capillary action. Under these conditions the electrolyte salts which accumulate in the vent are apt seriously to impair its capacity for passing gas. A procedure which is adapted to render the tab portions substantially impervious to water without destroying the gas-conducting properties thereof, comprises impregnating such tab portions with a mixture of paraffin, 10%, and carbon tetrachloride or similar volatile solvent, 90%. This is followed by heat treatment to evaporate the solvent.

The tab or vent portions of the spacers may be varied as to cross sectional area depending upon the porosity of the material used and upon the venting capacity desired. Such venting capacity is controlled within certain predetermined limits, these varying in accordance with the size and other characteristics of the cell. A test which has proven suitable in standardizing such vent tabs consists in passing such a vent tab through a partition or other medium which is otherwise impermeable to gases. A vacuum is then created on one side of the partition and the rate of flow of air through such tab is measured. For venting cells of the size and type used in radio "B" batteries comprising cells of the flat type now on the market suitable vent tabs pass air at rates from 0.15 to 1.5 cc. per minute through a length equivalent to their operating path in the cell, under a vacuum of 61 millimeters of mercury.

In the drawing, air spaces 21 are shown in dotted line as formed in the mix cakes at points remote from the peripheral edge portions. These spaces preferably take the form of a plurality of narrow groove-like depressions in that face of the mix cake which abuts against the bibulous spacer 13. The spacers are also shown as provided with slit valves 22 adapted to permit paste forced away from the zinc anodes to pass through the spacers into the air spaces 21. It will be understood, however, that the present invention may be used in batteries including other types of air spaces than the type shown.

While the invention has been described with reference particularly to batteries of dry cells of the flat type it is to be understood that the application of the invention to cylindrical dry cells, employing a bibulous paper liner, is not precluded.

I claim:

1. A dry cell having a moist mix substantially surrounded by walls of insufficient permeability to vent the gases produced within the cell, a bibulous spacer separating said mix from the anode, and a tab permeable to gases but water-repellent, said tab being joined to said spacer and extending through one of said walls to provide capillary gas passages therethrough.

2. A dry cell battery comprising a plurality of flat electrode elements arranged in spaced relation, depolarizer mix in the spaces between said elements and spaced from certain of said elements by bibulous spacing members, plastic sealing material encasing the cell assembly thus formed, and tabs joined to the spacing members and extending through the sealing material, said tabs being impregnated with a water-repellent substance and providing capillary passages between the respective cells and the atmosphere.

3. A dry cell battery comprising a plurality of flat duplex electrodes arranged in spaced relation, depolarizer mix in the spaces between said elements, bibulous spacers between the mix and the anode surfaces of the electrodes, said spacers having tab portions extending beyond the peripheral edge portions of the adjacent electrodes, and sealing plastic completely surrounding the assembly but leaving the ends of the tabs exposed.

In testimony whereof I affix my signature.

ALTON KARL HUNTLEY.